United States Patent [19]
Sternowski

[11] Patent Number: 5,886,081
[45] Date of Patent: Mar. 23, 1999

[54] EFFICIENT DIELECTRICALLY HEATABLE COMPOUND AND METHOD

[75] Inventor: Robert Henry Sternowski, Cedar Rapids, Iowa

[73] Assignee: Rockwell Science Center, Inc., Thousand Oaks, Calif.

[21] Appl. No.: 906,061

[22] Filed: Aug. 5, 1997

[51] Int. Cl.$^6$ .................................................. C08K 3/00
[52] U.S. Cl. .......................... 524/495; 524/496; 524/508
[58] Field of Search .................................. 524/508, 495, 524/496

[56] References Cited

U.S. PATENT DOCUMENTS 3,737,488 6/1973 Porter et al. ............................... 264/26
5,182,134 1/1993 Sato ......................................... 427/543

*Primary Examiner*—Edward J. Cain
*Attorney, Agent, or Firm*—Kyle Eppele; James P. O'Shaughnessy

[57] ABSTRACT

A compound and method for dielectrically heating plastic in a mold with an RF source. A novel molding compound includes, in one embodiment, plastic such as polystyrene having a first dielectric constant and a water based resin such as phenolic resin. A lossy additive, such as a chemically inert low dielectric material, having a second dielectric constant substantially lower than that of the plastic, is added to the molding compound. The lossy additive increases the RF energy absorbed by the plastic molding compound thereby reducing heating time in the mold.

7 Claims, 4 Drawing Sheets

EFFICIENT DIELECTRICALLY HEATABLE COMPOUND AND METHOD

BACKGROUND

This invention relates to efficient compounds and methods for dielectrically heating relatively non-conductive materials.

There are several benefits to an efficient process for recycling discarded plastics, such as polystyrene and styrofoam, into new, useful products. For example, consuming scrap plastic such as packing "peanuts" and styrofoam cups or dishes, rather than discarding the scrap plastic, has a beneficial impact on the environment by lessening the demand for landfill space. Additionally, recycling scrap may result in a lower demand for the raw materials and energy necessary to produce new plastic, once again benefiting the environment.

One known end use for recycled plastics is the creation of fire-retardant construction materials. For example, U.S. Pat. No. 4,596,682 discloses a phenolic resin plastic polymer for bonding shredded styrofoam chips into molded foam insulating panels and blocks for the construction industry. A significant feature of the polymer is that it produces a fire-retardant foam product, as opposed to high flammability typical of polystyrene and styrofoam.

Molded plastic items may be manufactured by creating a mold of the desired item introducing plastic resin into the mold, and heating the plastic resin until it begins to "cure" (heating the plastic until an exothermic reaction commences). One method of heating the plastic is to apply radiant heat. However, in practice, it was found that radiant heat sources simply cured or charred the outer surface of the plastic, but left the inside uncured. Thus, a different form of heating was required.

Another method of curing recycled plastics in a mold is to apply non-radiant heating. One form of non-radiant heating is microwave heating which heats primarily by agitating water molecules (resonant at 2.45 GHz) in the material to be heated. Microwave heating subjects poorly conductive materials to antenna-launched electromagnetic energy at microwave frequencies, typically at frequencies of about 2.45 GHz. U.S. Pat. No. 3,848,038 discloses an example of heating nonconductive materials with microwave energy. The thickness, size, and composition of material to be heated, however, limits the applicability of microwave heating.

Another form of non-radiant heating is dielectric heating. Similar to microwave heating, dielectric heating occurs when an electrically non-conductive material is subjected to radio-frequency ("RF") energy. However, dielectric heating is most commonly applied with an electric field, that is, between flat parallel plates of a capacitor, rather than an antenna, and at lower frequencies, typically 3–30 MHz, than microwave heating.

In dielectric heating, the electric field is generated by applied equal and opposite potentials on the two opposing metal plates of a capacitor. In a typical mold, the capacitor plates form the sides of the mold. A radio frequency power source ("RF source") is applied to the capacitor plates. Typically, one plate and one side of the RF source are at ground, and the other plate is connected to the high side of the RF source. The material to be molded is inserted between two plates of a capacitor. When the molding compound is a plastic resin, the dielectric heating will raise the resin to its polymerization point, triggering an exothermic reaction and hardening the resin.

Various types of plastic, such as recycled polystyrene foam, have such a high dielectric constant that minimal RF energy is absorbed, thereby prolonging the heating period. Long heating periods add recurring costs to the recycling process, and lower the process throughput.

In particular, expanded polystyrene beads have a very high dielectric constant, and absorb very little RF energy. Phenolic resins are primarily water by weight. Water readily absorbs microwave energy, but the loss factor for water decreases with decreasing frequency, and no longer readily absorbs RF energy at frequencies typical of available industrial radio RF sources. Additionally, microwave energy is not preferable for large (e.g., 48 inch by 96 inch) workpieces. The use of frequencies where the mold is a quarter-wavelength or more in size causes uneven energy distribution and thus uneven heating. Also, large molds have resonant frequencies much lower than frequencies in the microwave range.

It is known to combine various additives with a dielectric to affect the RF energy absorbing characteristics of the dielectric. However, some prior attempts are not compatible with the water in phenolic based resins. See, for example, U.S. Pat. No. 4,790,965 (disclosing clay and earth additives, which should be dry to work) and U.S. Pat. No. 3,640,913 (disclosing zinc halide, which is anhydrous and incompatible with water-based resins). Other prior attempts operate at microwave frequencies, where a water based resin would readily absorb RF energy without any additive. See, for example, U.S. Pat. No. 3,848,038.

On aspect of the invention is to provide a novel dielectrically heatable compound, comprising a molding compound including, in one embodiment, plastic having a first dielectric constant and a water based resin; and a lossy additive, having a second dielectric constant substantially lower than the first dielectric constant. The plastic may comprise expanded polystyrene. The water based resin may comprise phenolic resin. The lossy additive may comprise graphite, carbon, or a mixture of graphite and carbon.

Another aspect of the invention is to provide a process for molding plastic by dielectrically heating the plastic in a mold with an RF source, comprising the steps of mixing plastic with a water-based resin, increasing a loss factor of the plastic and water-based resin, placing the plastic and water-based resin in the mold, generating RF energy with an RF source, and applying the RF energy to the mold. The step of generating RF energy with an RF source may, in one embodiment, include the step of generating RF energy in a range from 3 MHz to 30 MHz. The step of increasing the loss factor of the plastic and water-based resin may, in one embodiment, include the step of adding a low dielectric additive, such as carbon, or graphite, or both.

DETAILED DESCRIPTION

Figure 1:
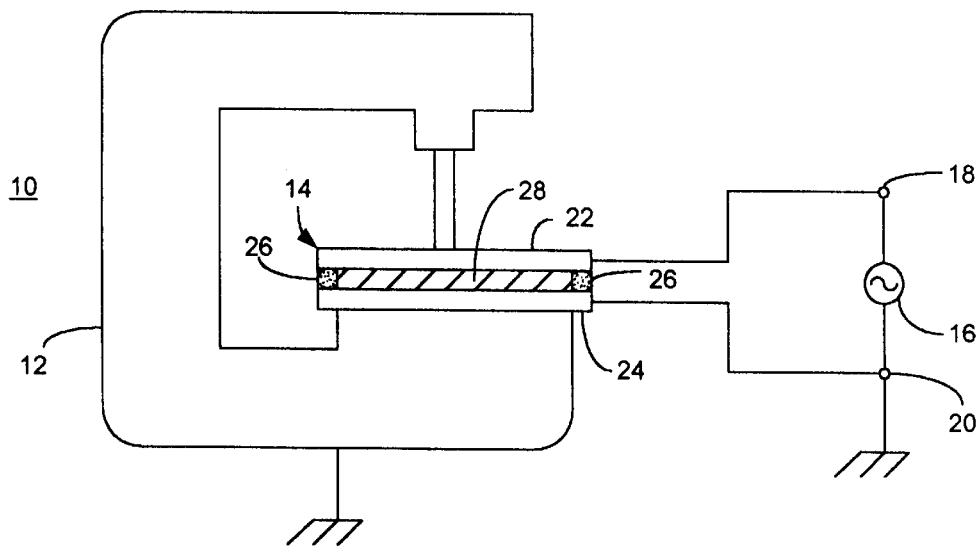
FIG. 1 is a diagrammatic illustration of a prior art dielectric heater.

A typical known dielectric heater 10 is shown in FIG. 1. The apparatus includes a hydraulic press 12, a parallel plate mold 14, and an RF source 16. The hydraulic press 12 is connected to ground (i.e., earth potential). Ground may be provided by a ground rod (not shown) driven into the soil and electrically connected to the hydraulic press 12, or by any other of many well-known grounding techniques. The RF source 16 has a RF terminal 18 and a common terminal 20. The common terminal 20 of the RF source 16 is typically connected to ground.

The parallel plate mold 14 includes a top plate 22, a bottom plate 24, and a fence 26. A workpiece 28 to be molded is between the top plate 22 and the bottom plate 24. The top plate 22, the bottom plate 24, and the workpiece 28 comprise a capacitive-resistive impedance. The top plate 22 and bottom plate 24 are electrically conductive, and typically comprised of metal. The bottom plate 24 is connected to the common terminal 20 of the RF source 16 and the top plate 22 is connected to the RF terminal 18 of the RF source 16, as shown.

In operation, the parallel plate mold 14 typically applies uniform pressure across the workpiece 28. Pressure is applied by the hydraulic press 12. The RF source 16 is energized to provide RF energy. The workpiece 28 absorbs RF energy and is heated, curing the workpiece 28.

Known dielectric heaters inefficiently use high-power RF sources to heat the workpiece. High power RF sources are required in previously known dielectric heaters because the RF sources are not impedance matched to the parallel plate mold, but rather used "brute force" power. The actual electrical impedance of a parallel plate mold is very small in comparison to the high impedance of a typical vacuum tube plate circuit, a common RF source.

Figure 2:
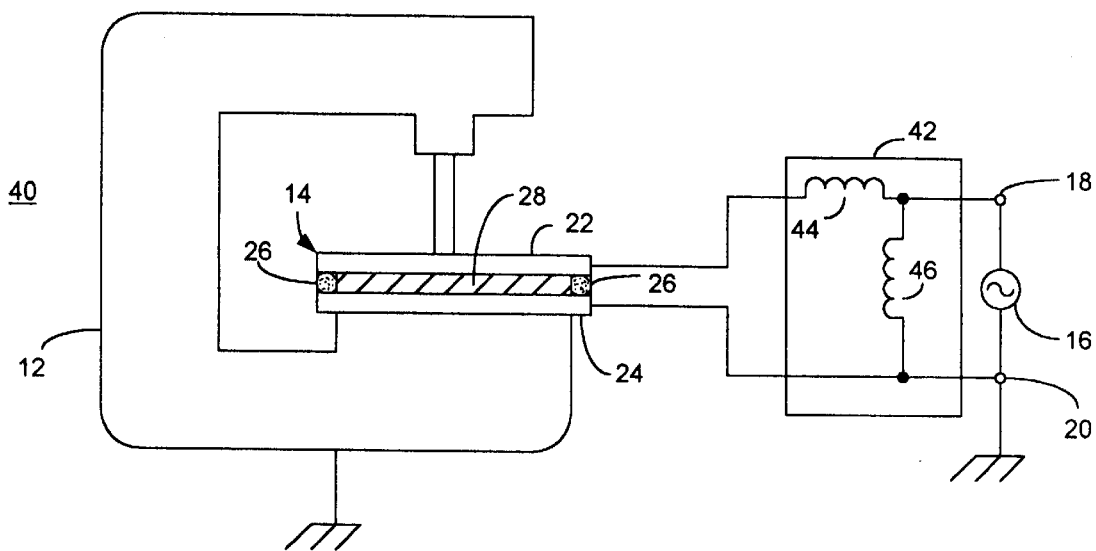
FIG. 2 is a diagrammatic illustration of a dielectric heater according to one embodiment of the present invention.

Referring to FIG. 2 there is shown one embodiment of an impedance-matched dielectric heater 40. The impedance-matched dielectric heater 40 includes a hydraulic press 12, a parallel plate mold 14, an impedance matching network 42, and a RF source 16. The hydraulic press 12 is connected to ground. The RF source 16 has a RF terminal 18 and a common terminal 20. The common terminal 20 of the RF source 16 may be electrically connected to ground.

The parallel plate mold 14 includes a top plate 22, a bottom plate 24, and a fence 26. The top plate 22, the bottom plate 24, and a workpiece 28 comprise a complex impedance, including capacative impedance and resistive impedance. The top plate 22 and the bottom plate 24 are electrically conductive, and typically comprised of metal. The top plate 22 and bottom plate 24 metal should be selected to be resistant to the chemical reaction of the curing resin or escaping steam. The top plate 22 and the bottom plate 24 should not be so thin a foil that they will tear or puncture during use. The bottom plate 24 is typically at ground and thus may be connected to the hydraulic press 12, which is also typically grounded. The top plate 22 is typically connected to the RF terminal 18 of the RF power source 16. However, the potentials of the top plate 22 and the bottom plate 24 may be reversed if desired.

The fence 26 comprising the sides of the parallel plate mold 14 should be of high dielectric strength material such that the fence 26 offers a much higher-resistance electrical path to the RF energy than does a workpiece 28 disposed between the top plate 22 and the bottom plate 24. Dielectric strength may vary with respect to the frequency, so dielectric strength is typically evaluated in the frequency range of the RF source 16. Commonly used materials for the fence 26 include FR4, Ryton, teflon and ceramic. Additional variants of the epoxy-glass family of materials may also be acceptable.

The parallel plate mold 14 typically applies uniform pressure across a workpiece 28 disposed between the top plate 22 and the bottom plate 24. Pressure is applied by the hydraulic press 12. The parallel plate mold should also be easily filled and then emptied after curing. The parallel plate mold 14 may be mounted in any orientation. A continuous process mold may also be implemented.

There are certain physical considerations typically given to the design of a parallel plate mold 14. The parallel plate mold 14 is typically designed to withstand temperatures of at least 110–130 Celsius. The parallel plate mold should be designed to withstand an estimated molding pressure of 25,000–30,000 lbs. Generally, one-tenth inch spacing for each kilovolt of applied potential is provided between the top plate 22 and the bottom plate 24 to reduce the possibility of an electrical arc between the top plate 22 and the bottom plate 24. The spacing may be doubled for very humid environments, such as a process that requires venting of steam. A mechanically durable sheet of high dielectric material (e.g.0.060 inch thick sheet of Teflon) on the bottom of the parallel plate mold 14, covering completely the bottom plate 24, further reduces the possibility of an unwanted electrical arc.

The plate coupled to the RF terminal 18 of the RF source 16 (in the illustrated embodiment, the top plate 22) is electrically insulated from the hydraulic press 12. Design considerations for the electrical insulation include possible electrical arcs from the top plate 22 to the hydraulic press 12 and field perturbation. Electrical arcs may be prevented with an insulator a few inches thick. With respect to field perturbation, metal structures in the field proximity may act as a "parasitic capacitance" and diminish and/or distort the radio energy applied to the workpiece 28. Field perturbation may cause uneven heating and hence curing, degrading the quality of the finished workpiece 28. Such field perturbation is avoided by minimizing the capacitance from the top plate 22 to the hydraulic press 12. The capacitance from the top plate 22 to the hydraulic press 12 may be minimized by minimizing the parallel area of the hydraulic press 12 and maximizing the separation between the top plate 22 to the hydraulic press 12. A separation between the press hydraulic 12 and the top plate 22 of four times the thickness of the workpiece 28 is desirable in the illustrated embodiment. The total parasitic capacitance in the illustrated embodiment should be no more than one-tenth the parallel plate mold 14 capacitance.

Additional aspects may be considered in the construction of the top plate 22 and the bottom plate 24. For example, sharp points or edges are to be avoided. Points and edges may to "focus" the electric field and increase the potential at the point or edge, which may induce an arc to short circuit the RF mold. Typically, each corner is rounded to a minimum of about a 0.25 inch radius.

Due to safety and radio emission requirements, typically the parallel plate mold 14 may be enclosed in a Faraday cage (not shown). A satisfactory shield design will totally encompass the parallel plate mold 14, be constructed of metal (a mesh grid of 0.5–1 inch is satisfactory), be connected well to earth rods driven through the floor into the soil, and be easily opened/closed so as not to impede the efficiency of the manufacturing processing. Also, should the capacitor plates be touched by an individual while the RF power is being applied, the individual risks severe injury or death. Therefore, for safety considerations, the parallel plate mold 14 may include a positive disconnect means of inhibiting the RF power source while the cage is open and the parallel plate mold 14 is being filled or emptied. Additionally, a vapor hood (not shown) may be added to capture outgases from the curing process.

The complex impedance of the parallel plate mold 14 includes a resistive component and a reactive (mostly capacitive) component. During dielectric heating, real power is dissipated in the resistive component of the impedance of the parallel plate mold 14. Reactive power does not dielectrically heat the workpiece 28. The impedance-matching network 42 impedance matches the output impedance of the RF source to the resistive component of the parallel plate mold, while "tuning-out" the reactive component, thereby increasing efficiency.

In the illustrated embodiment, an "L" network comprising series inductor 44 and shunt inductor 46 is shown as providing the impedance matching. The series inductor 44 is connected in series with the RF terminal 18 of the RF source 16 and the top plate 22. The shunt inductor 46 is connected in parallel across the RF terminal 18 and the common terminal 20 of the RF source 16. However, various networks for achieving impedance matching are known, and any of these networks may be employed as necessary for a given RF source 16 and parallel plate mold 14.

The impedance of the parallel plate mold 14 is a function of the geometry of the parallel plate mold 14 and the electrical characteristics of the workpiece 28. The electrical characteristics of the workpiece 28 may vary as the workpiece 28 is heated, thereby causing the impedance of the parallel plate mold 14 to vary as well. In some cases, the electrical properties of the workpiece 28 will be sufficiently stable to allow the use of a fixed impedance-matching network 42. In other cases, it is contemplated that an automatically tuned impedance-matching network 42 may be used.

In practice, the impedance-matched dielectric heater 40 is more efficient that the previously known dielectric heater 10. In one embodiment, the impedance-matched dielectric heater 40, using a 1 kW RF source, heated a workpiece comparably with the previously known 20 kW RF source.

As the size of the desired workpiece 28 increases, so does the size of the top plate 22 and the bottom plate 24, thereby increasing the area of the parallel plate mold 14. Increasing the area of the parallel plate mold 14 generally increases the capacitance of the mold. The increased capacitance may have two detrimental effects on dielectric heating efficiency. First, the increased capacitance may render a feasible matching network more difficult, or even impossible, to achieve. As discussed above, impedance mis-matching degrades dielectric heating efficiency. Second, the resonant frequency of the parallel plate mold 14 is lowered. Because workpieces typically absorb energy more readily at higher frequencies, lowering the resonant frequency of the parallel plate mold 14 results in a further reduction in efficiency.

Figure 3:
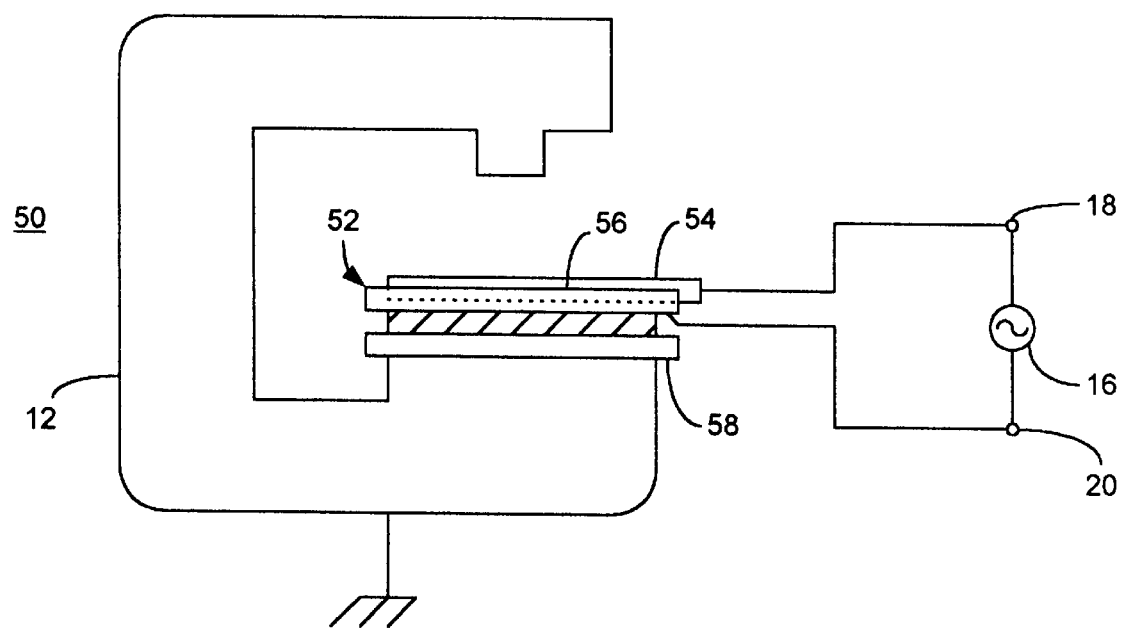
FIG. 3 is a diagrammatic illustration of a dielectric heater according to another embodiment of the present invention.

Referring to FIG. 3, there is shown one embodiment of a series cell dielectric heater 50 according to the invention. The series cell dielectric heater 50 includes a hydraulic press 12, a series cell mold 52, and a RF source 16. The hydraulic press is connected to ground. The RF source has a RF terminal 18 and a common terminal 20.

The series cell mold 52 illustrated in FIG. 3 is a type of parallel plate mold including a plurality of parallel plates. In the embodiment illustrated in FIG. 4 and FIG. 5, the series cell mold 52 includes a first RF potential plate 54, a second RF potential plate 56, and a floating potential plate 58. The first RF potential plate 54 is connected to the RF terminal 18 of the RF source 16. The second RF potential plate 56 is connected to the common terminal 20 of the RF source 16. The floating potential plate 58 is electrically insulated from the RF source 16 and from ground potential. The first RF potential plate 54 and the second RF potential plate 56 are generally located in the same plane, and are parallel and spaced apart from the plane of the floating potential plate 58. Generally, the area of first RF potential plate 54 and the second RF potential plate 56 are equal to maintain an equal voltage drop— and hence power dissipation—per unit area to assure even heating. However, should uneven heating of the workpiece 28 be desired, the areas of the RF potential plates may be varied.

Figure 6:
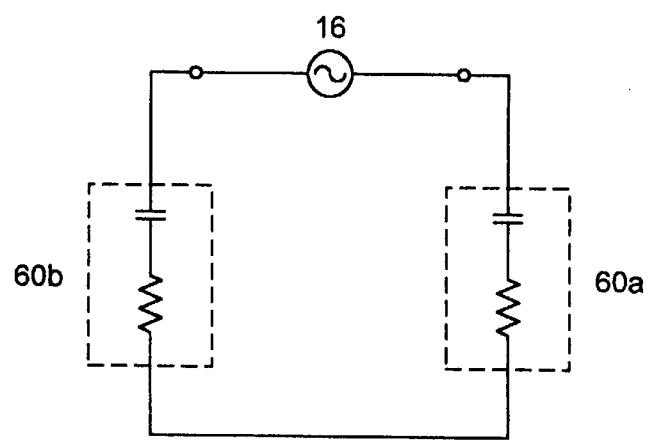
FIG. 6 is a schematic illustration of the electrical properties of the series cell mold of FIG. 4.
Figure 5:
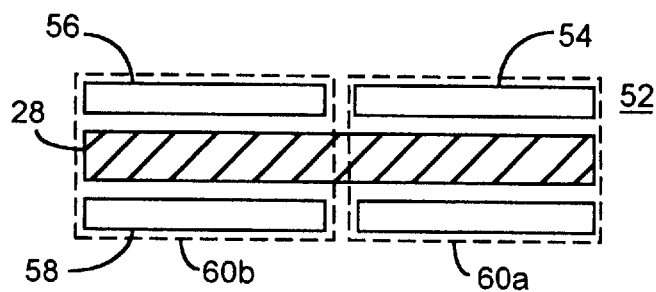
FIG. 5 is a side view of the series cell mold of FIG. 4.

The first RF potential plate 54 and the portion of the floating potential plate 58 covered by the first RF potential plate 54 comprise a first cell 60a of the series cell mold 52. The second RF potential plate 56 and the portion of the floating potential plate 58 covered by the second RF potential plate 56 comprise a second cell 60b of the series mold 52. When the RF source 16 is energized, cell 60a and cell 60b create an electric field across the workpiece 28. As illustrated in FIG. 5 and FIG. 6, the floating potential plate 58 is physically part of both the first cell 60a and the second cell 60b, but may be modeled as two separate plates connected in series. Thus, the first cell 60a is connected in series with the second cell 60b.

When the area of first RF potential plate 54 equals the area of the second RF potential plate 56, the first cell 60a and the second cell 60b have the same electrical impedance. The capacitance for the illustrated series cell mold 52 is one half the capacitance of one of the cells. Capacitance, in picofarads, is calculated as $0.225 \times E \times A$ (in$^2$)/T (in), where E=relative dielectric of material between plates, A=plate parallel area in square inches, and T=spacing between plates in inches. The resistance for the illustrated series cell mold 52 is twice the resistance of one of the cells.

Figure 4:
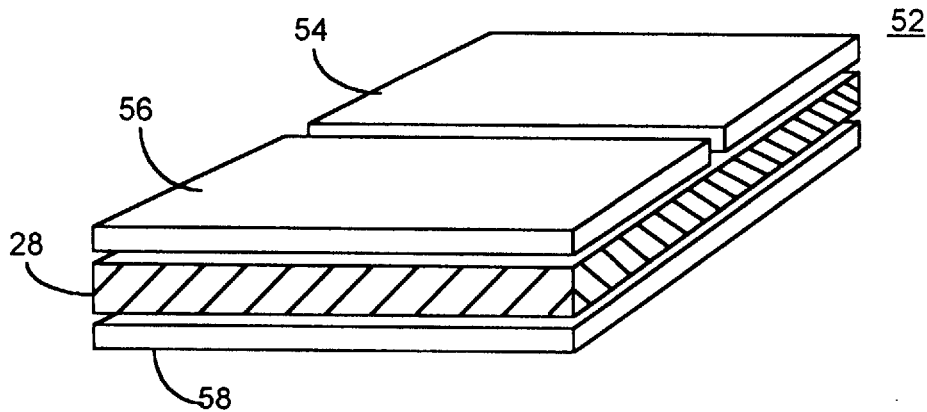
FIG. 4 is a perspective view of a series cell mold according to one embodiment of the present invention.
Figure 7:
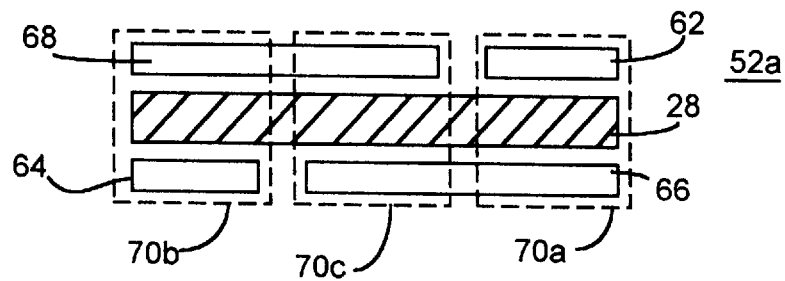
FIG. 7 is a side view of another series cell mold according to another embodiment of the present invention.
Figure 8:
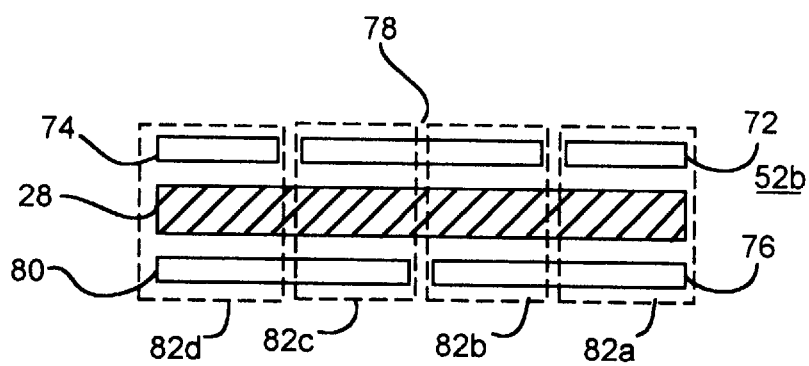
FIG. 8 is a side view of another series cell mold according to another embodiment of the present invention.

The embodiment that is illustrated in FIG. 4 & FIG. 5 and having two RF potential plates, thereby creating two cells, was given as the simplest and most easily described embodiment of the series cell mold 52. However, various quantities and geometric arrangements of cells may be desirable depending on any given mold or RF source 16. For example, FIG. 7 illustrates one embodiment of a three cell series cell mold 52a, having a first cell 70a comprising a first RF potential plate 62 spaced apart from a portion of a first floating plate 66, a second cell 70b comprising a second RF potential plate 64 spaced apart from a portion of a second floating potential plate 68, and a third cell 70c comprising a portion of the first floating plate 66 spaced apart from the second floating plate 68. Also, FIG. 8 illustrates one embodiment of a four cell series cell mold 52b, having a first cell 82a comprising a first RF potential plate 72 spaced apart from a portion of a first floating plate 76, second cell 82b comprising a portion of the first floating plate 76 spaced apart from a portion of a second floating plate 78, third cell 82c comprising a portion of the second floating plate 78 spaced apart from a portion of a third floating plate 80, and a fourth cell 82d comprising a second RF potential plate 74 spaced apart from a portion of the third floating potential plate 80.

The examples shown in FIG. 4 to FIG. 8 are illustrative embodiments. Many variations to the illustrated embodiments that will be apparent to one of ordinary skill in the art.

The invention encompasses these many multi-cell arrangements and variations, including various numbers of cells, cell shapes, and cell configurations.

Where the areas of cells are equal, the total capacitance of the series mold 52 may be calculated as the capacitance of one cell divided by the number of cells. The total resistance is the resistance of one cell times the number of cells. Where the areas of the cells are not equal, the total capacitance of the series cell mold 52 may be calculated as the inverse of the sum of the inverse of the capacitance of each cell. The total resistance is the sum of the resistance of each cell.

A given desired impedance of the series plate mold 14 may be achieved with the appropriate selection of cell size, number of cells, and the electrical properties of the workpiece 28. The impedance of the series cell mold 52 may be designed to fall within an impedance tuning range of a standard RF source 16. Such a design would reduce the complexity of an otherwise expensive impedance matching network 42, or eliminate the impedance matching network completely, while retaining the high efficiency of an impedance-matched dielectric heater 40.

A given desired resonant frequency of the series cell mold 52 may also be achieved with the appropriate selection of cell size, number of cells, and the electrical properties of the workpiece 28. The resonant frequency of the series cell mold 52 may be designed to approximate a frequency that is within a tuning range of the RF source 16 and/or most efficiently absorbed by the workpiece 28. Such a design provides more efficient heating of the workpiece 28.

The series cell dielectric heater 50 of the present invention is capable of molding sheets up to 4 feet by 8, or larger, including materials suitable for building construction. In practice, a given mold may be a cassette of a size and shape unique to the workpiece 28 that it produces. The cassette is rolled into a dielectric heater of the present invention on a roller conveyer. The hydraulic press 12 compress a plunger on the parallel plate mold 14 cassette, and RF power is applied. Heating takes from 30 to 70 seconds, at which time the hydraulics are reversed and the parallel plate mold 14 cassette is rolled out of the press.

The above described embodiments of dielectric heaters are contemplated to transfer RF energy to their respective molds in the 3–30 MHz range. However, the workpiece may not readily absorb RF energy at the contemplated frequencies. For example, The workpiece 28 may comprise a molding compound of recycled expanded polystyrene foam ground into pieces and mixed with a phenyl-based resin for bonding the recycled plastic into a unitary component. Such a workpiece may have a relatively high dielectric constant, and not readily absorb RF energy.

According to one aspect of the present invention, an inert, low dielectric material is added to the plastic molding compound. In one embodiment the low dielectric material is chemically inert and in another embodiment the low dielectric material may be a non-inert or reactive material. The low dielectric material increases the amount of RF energy absorbed by the plastic molding compound, reducing heating times. Low dielectric materials include graphite and carbon. For example, adding graphite to the plastic molding compound, in the amount of about 50% of total weight, significantly reduces the time required to adequately heat the workpiece 28 in a mold. Adding a 75% graphite/25% carbon mix to the plastic molding compound, in the amount of about 50% of total weight, significantly reduces the time required to adequately heat the workpiece 28 and raises the maximum temperature achieved by the workpiece 28. Plain carbon may also be used.

Specific embodiments of the invention have been described herein for purposes of illustrating the manner in which the invention may be made and used. It should be understood that implementation of other variations and modifications of the invention in its various aspects will be apparent to those skilled in the art, and that the invention is not limited thereto by the specific embodiments described. It is therefore contemplated to cover by the present invention any and all modifications, variations or equivalence that fall within the true spirit and scope of the basic underlying principles disclosed and claimed herein.

What is claimed is:

1. An RF energy dielectrically heatable compound, comprising:

a molding compound, including plastic having a first dielectric constant and a water based resin; and a lossy additive, having a second dielectric constant substantially lower than the first dielectric contact such that RF energy absorbability of the dielectrically heatable compound is increased, wherein the lossy additive is a form of carbon.

2. The dielectrically heatable compound of claim 1 wherein the plastic further comprises expanded polystyrene.

3. The dielectrically heatable compound of claim 1 wherein the water based resin further comprises phenolic resin.

4. The dielectrically heatable compound of claim 1 wherein the lossy additive is graphite.

5. The dielectrically heatable compound of claim 1 wherein the lossy additive is a mixture of graphite and carbon.

6. The dielectrically heatable compound of claim 1 wherein the lossy additive is non-inert.

7. An RF energy dielectrically heatable compound, comprising:

expanded polystyrene;

a water-based thermosetting resin; and a form of carbon comprising approximately 50 percent of a total weight of the compound and increasing a loss factor of the dielectrically heatable compound.

\* \* \* \* \*